April 20, 1926.
Re. 16,326
F. S. BACON
ROTATING RETORT
Original Filed April 7, 1923
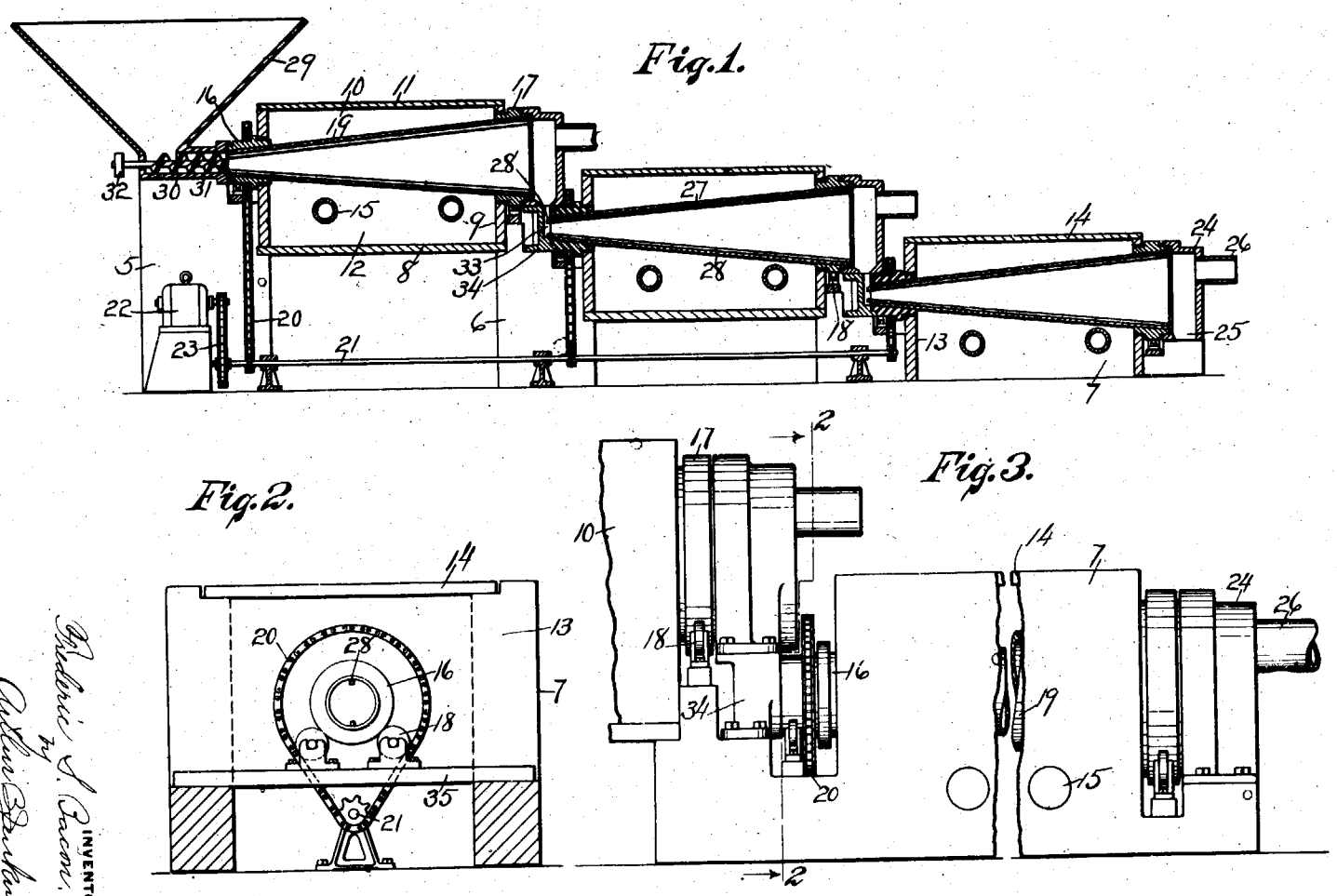
Frederic S. Bacon, INVENTOR
by Arthur Jenkins, ATTORNEY Reissued Apr. 20, 1926.

Re. 16,326

UNITED STATES PATENT OFFICE.

FREDERIC S. BACON, OF MIDDLETOWN, CONNECTICUT, ASSIGNOR TO MARIEA A. BACON, OF MIDDLETOWN, CONNECTICUT.

ROTATING RETORT.

Original No. 1,556,194, dated October 6, 1925, Serial No. 630,501, filed April 7, 1923. Application for reissue filed January 22, 1926. Serial No. 83,152.

*To all whom it may concern:*

Be it known that I, FREDERIC S. BACON, a citizen of the United States, and a resident of Middletown, in the county of Middlesex and State of Connecticut, have invented new and Improved Rotating Retorts, of which the following is a specification.

My invention relates more especially to that class of devices employed for separating, by means of heat, masses of material into the various ingredients composing such masses, and an object of my invention, among others, is to provide a device of this class by means of which the separation of such ingredients may be conducted in a thorough, efficient and expeditious manner.

One form of apparatus embodying my invention and in the construction and use of which the objects herein set out, as well as others, may be attained, is illustrated in the accompanying drawings, in which—

Figure 1 is a view in central vertical section lengthwise through an apparatus embodying my invention.

Figure 2 is a view in cross section on plane denoted by the dotted line 2—2 of Figure 3.

Figure 3 is a view in side elevation, scale enlarged, of a portion of the apparatus, showing parts broken away at opposite ends and also intermediate said ends.

While my invention is not limited in its use to the treatment of any specific kind of material, yet as it finds ready adaptation in the separation from oil shale of the various ingredients comprised in such shale, I have illustrated my invention in connection with an apparatus especially adapted for the treatment of such material, such apparatus, generally speaking, comprising a base or foundation for tubes that are rotatably mounted upon said foundation, the latter also being provided to receive or contain heating means of any suitable kind for heating the tubes.

The structure as shown herein is composed of several sections arranged in downwardly stepped formation from the inlet to the outlet end of said structure. The section at the inlet end of the structure includes posts 5—6, two of each of said posts located at each end of the section. The intermediate section is composed partially of two of the posts 6 and partially of the ends of two side walls 7, said side walls being comprised in the outlet section of the apparatus. The posts 5 and 6 are spaced apart both lengthwise and laterally of the structure and the ends of the sides 7 are spaced from the posts 6. The several posts and side walls are suitably formed with shoulders or ledges to receive other parts comprising the inlet, intermediate and outlet sections of the apparatus.

The inlet and intermediate sections are provided with bottom plates 8 resting upon the ledges above referred to and end plates 9 are supported upon and rise from said bottom plates. Sides 10 are also supported upon the bottom plates, the whole together with top plates 11 comprising a compartment constituting a furnace 12 appurtenant to each of the sections. The furnace of the outlet section is composed of the side walls 7, end walls 13 and a top plate 14. Each of the furnaces is supplied with heating means, as burners 15 that may be of any suitable form and construction, or the heat may be supplied by any other suitable heating appliance. It will be understood that the corner posts, top, bottom and end plates and the sides and side walls, hereinbefore described, are composed of any suitable material to support the structure and to withstand the heat conditions to which the apparatus will be subjected. Each of the end plates has openings to receive projections from flanged journals 16—17 that are mounted in any suitable manner, as upon rollers 18 so that they may be easily rotated.

A cone shaped tube 19 appurtenant to each of the sections is secured at each end to one of these journals, said tubes preferably projecting through the journals. The small end of each tube is located at the receiving end of the chamber in each section and the large end of said tube is located at the discharge end of each chamber, and the rollers above referred to permit said tubes to be easily rotated. This rotation may be obtained as by means of a sprocket chain 20 passing around sprocket wheels secured one to a driving shaft 21 and the other to the journal 16. This shaft may be driven as by means of a motor 22 or any other suitable source of power, in the structure shown the motor being connected with the shaft 21 as by means of sprockets and a sprocket chain 23.

A discharge housing 24 is located at the discharge end of the tube in each section of the apparatus, the journal 17 preferably projecting into said housing. The bottom of each housing has a discharge opening 25, and the top of each housing has a gas discharge tube 26 projecting, preferably, from the end wall of the housing.

It will be found in many instances that a plain tube may be employed with satisfactory results in the sections, the taper of the tube being such as to provide the necessary feed of the material along the tube from the receiving to the discharge end, but as a means for disturbing the regular movement of the material as it travels along the tube, I have shown fins 27 located on opposite sides of the interior of the tube and extending lengthwise thereof. It will be understood, however, that these fins may, or may not, be employed as circumstances may demand.

The rollers 18 are mounted upon bars 35 extending across the apparatus and supported by the sides thereof, this applying to the rollers 18 at both the inlet and outlet ends of the tubes.

The apparatus as ordinarily constructed will comprise a plurality of the sections that may be constructed in any suitable manner and of any desired material, each equipped with apparatus as hereinabove set forth, such description applying in many respects to all of the sections. The number of such sections to be employed may vary depending upon the demands upon the apparatus.

As a means for supplying the apparatus with material a hopper 29 may be located at the receiving end of the receiving section of the apparatus, and a feed worm 30 may extend into a discharge opening 31 from the hopper leading into the small end of the tube 19 at the receiving end of the apparatus. This worm may be driven as by means of a belt passing around a pulley 32. The discharge openings 25 in the housings 24 each lead into a receiving opening 33 in a head 34, which receiving openings conduct the material from the large end of one rotating tube to the small end of the succeeding rotating tube. As a means for aiding the feed of the material through the receiving openings 33 into the tube the fins 27 are projected as at 28 beyond the end of the tube into such receiving openings.

In the operation of the device the material, as oil shale, is fed into the hopper 29 and the apparatus being in operation, the conical tubes being rotated, and heat being applied to such tubes, the material will pass from the receiving to the discharge end of each of the tubes. As such material is heated the gases and vapors will rise in the tubes, the tops of which slope upwardly toward the discharge ends thereof to permit such gases and vapors to readily and naturally flow to and out of the gas discharge tubes 26 or such other discharges as may be provided. These gases and vapors may then be disposed of in any well known manner, to separate them, as by condensation, into the various ingredients, and this operation will take place with respect to each of the tubes 19. These tubes will be employed in such numbers as to enable all of the gases and vapors to be extracted from a mass of material passing from the inlet of the first tube to the outlet of the last tube, the residue of such material passing through the discharge opening of the last tube.

By the use of my improved cone shaped tube disposed with the smaller end as the inlet and the larger end as the outlet, I am enabled to obtain a flow in the same direction of the material, as shale, and the gases obtained from such material. This is an essential feature as it enables the gases to be taken off at the maximum temperature of the tube which is the highest and at approximately the required degree at the outlet end, and this avoids a cooling of the gases and a consequent changing of their characteristics after they have once been heated to the degree desired.

Furthermore, the provision of a tapered tube enables a free and unobstructed flow of the gases to be obtained from the smaller to the larger end of the tube and without any pressure upon the vapors or gases, and this enables me to produce oils and other liquids directly from the vapors and gases and without the formation of a tar or similar substance which would result if any pressure was permitted or existed upon such vapors or gases. Than again, this free flow of the gases to the larger and outlet end of the retort causes the gases to be gradually heated more and more until they reach the required degree at or near the larger end of the tube at which they are readily taken off at such higher temperature.

It is herein emphasized that this is not an apparatus within which oils are produced, but it is an apparatus in which vapors or gases are formed and the oils or other liquids are obtained outside of the apparatus. My improved process cannot contemplate the treatment of oil from oil shale for the reason that oil does not exist in oil shale and is only obtained at the end of the operation and outside of the apparatus.

My arrangement of rotating tapered tubes one in advance of the other in the direction of movement of material through the tubes and with the small end of each tube adjacent to the larger end of the tube from which it receives its material, provides a retort composed of a number of tubes having independent heating means for each tube section, whereby it is possible to raise the temperature in each tube to a different degree, so that the vapor or gases may be taken off from each tube at specified temperatures, whereby different material may be produced from the action of the retort by the condensation of such vapors or gases which are emitted from each tube in strata or staged formation. This enables a staged reduction of the shale to be obtained, that is, by providing a separate heat zone for each set or family of vapors or gases a stratified distillation may be employed for each tube, for as soon as the vapors or gases are formed at their own heat they will remain in that condition until they pass out of the tube and they will not be subjected to a higher heat of another family at which they would be broken off into other compounds.

This enables the extraction of vapors or gases from oil shale by the movement of such shale from one cone shaped tube to another, the gases being obtained at different temperatures in different tubes from which different products may be derived in the condensation of the gases. As an example of the conditions I have found in shale from one locality the following appears:

By the use of the three retorts shown in the drawings the first retort may be heated to a temperature of substantially from 750° to 825°, the second retort heated to a temperature of substantially 875° to 950°, and the third retort heated to a temperature of substantially from 1000° to 1250°. The gases obtained from the first retort at substantially from 750° to 825° are suitable for the production of motor fuels, while the gases released from the second retort at the temperature stated are suitable for the production of lubricating oils, and the gases obtained from the third retort at the highest degree are suitable for coal tar products. There is a decided break or interval between the temperatures of succeeding tubes, in the example given herein there being a difference of at least fifty degrees between the higher temperature of each tube and the lower temperature of the next succeeding tube during which interval or break no results are obtained. It is quite evident, however, that conditions will vary in shale from different localities, or in different kinds of shale, or in different bituminous or other matter that may be passed through the retort, which retort is adapted for the treatment of a wide variety of substances, and in the treatment of which the temperatures may vary to a very considerable degree, more or less, from those given in the above example, and I, therefore, mention that the invention is not to be in any way limited or restricted by reason of the example herein given.

As before mentioned there is in each tube a distinct family or set of vapors, each family being composed of different vapors produced at the same range of temperature and that exist in stratified formation of different specific gravities and that flow at different rates of speed and each of which will produce an ingredient common to that family and different from the ingredients produced from the other vapors or members of the family, and the tapered formation of the tubes with the larger end in the direction of flow of the vapors avoids any pressure thereon and permits them to flow without restriction and thus to maintain their separate and distinct status in stratified formation.

In accordance with the provisions of the patent statutes I have described the principles of operation of my invention, together with the apparatus which I now consider to represent the best embodiment thereof; but I desire to have it understood that the device shown is only illustrative and that the invention may be carried out by other means and applied to uses other than those above set out.

I claim—

1. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, and the smaller receiving end disposed below the lower side of the larger end of the adjacent tube.

2. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, and the smaller receiving end disposed below the lower side of the larger end of the adjacent tube, and there being a material collecting chamber between the tubes.

3. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, and the smaller receiving end disposed below the lower side of the larger end of the adjacent tube, and longitudinally extending fins carried by the inner face of each tube and projecting outwardly of the smaller end thereof.

4. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, the smaller receiving end disposed below the lower side of the larger end of the adjacent tube, there being a material collecting chamber between each tube, and longitudinally extending fins carried by the inner face of each tube and projecting outwardly of the smaller end thereof.

5. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, the smaller receiving end disposed below the lower side of the larger end of the adjacent tube, bearing supports for each end of the tubes and power means connected to the bearings for the smaller ends of the tubes.

6. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, the smaller receiving end disposed below the lower side of the larger end of the adjacent tube, there being a material collecting chamber between each tube, bearing supports for each end of the tubes and power means connected to the bearings for the smaller ends of the tubes.

7. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, the smaller receiving end disposed below the lower side of the larger end of the adjacent tube, and independently controlled heating means associated with each tube whereby gases possessing different chemical properties may be sequestered from each tube.

8. A retort comprising a series of end communicating tapered tubes rotatably mounted and arranged in stepped down formation, the smaller ends of the tubes communicating with the larger ends of the tubes, the smaller ends of the tubes forming the inlets, vapor and gas conducting means for the larger end of each tube, the smaller receiving end disposed below the lower side of the larger end of the adjacent tube, there being a material collecting chamber between each tube, and independently controlled heating means associated with each tube whereby gases possessing different chemical properties may be sequestered from each tube.

9. A retort comprising a series of end communicating tapered tubes rotatably mounted and arranged in stepped down formation, the smaller ends of the tubes communicating with the larger ends of other tubes, the smaller ends of the tubes forming the inlets, and vapor and gas conducting means for the larger end of each tube.

10. A retort for the distilling of gaseous substances comprising a series of end communicating tapered tubes rotatably mounted, means for conducting material from the large end of one tube to the small end of a succeeding tube, means for disturbing flow of material, as it flows from the small end to the large end of each tube, and means for conducting gases and vapors from the upper part of the large end of each tube.

11. A retort comprising a series of end communicating tapered tubes rotatably mounted and arranged to provide flow of material by gravity from one tube to another, the smaller ends of the tubes communicating with the larger ends of other tubes, the smaller ends of the tubes forming the inlets and the larger ends the outlets, and vapor and gas conducting means for the larger end of each tube.

12. A retort for the treatment of gaseous substances and comprising a series of end communicating tapered tubes rotatably mounted and arranged to receive into the smaller ends of succeeding tubes substance from the larger end of a preceding tube, the smaller ends of the tubes forming the inlets, and vapor and gas conducting means for the larger ends of the tubes, 13. A retort for the treatment of gaseous substances and comprising a tube rotatably mounted and tapered to provide for the unrestricted flow without pressure of vapors or gases formed therein at a predetermined temperature, the smaller end of the tube forming the inlet and the larger end thereof the outlet, and vapor and gas conducting means for the larger end of said tube.

14. A retort for the treatment of gaseous substances and comprising a plurality of end communicating tubes mounted and tapered to provide for the unrestricted flow without pressure of vapors and gases formed therein at a predetermined temperature, the smaller end of each tube forming the inlet and the larger end thereof the outlet, and vapor and gas conducting means for the larger end of each tube.

15. A retort comprising a series of end communicating tapered tubes rotatably mounted and arranged in stepped down formation, the smaller ends of the tubes communicating with the larger ends of the tubes the smaller ends of the tubes forming the inlets, vapor and gas conducting means for the larger end of each tube, the smaller receiving end disposed below the lower side of the larger end of the adjacent tube, and longitudinally extending fins carried by the inner face of each tube to disturb flow of material in said tube.

FREDERIC S. BACON.